United States Patent [19]

Rider et al.

[11] Patent Number: 5,204,048

[45] Date of Patent: Apr. 20, 1993

[54] METHOD FOR MAKING A BUNDLE OF HELICAL TUBES AND APPARATUS FOR SEPARATING IMPURITIES FROM A POLLUTED LIQUID

[75] Inventors: Allison L. Rider, 313 Hames Rd., Watsonville, Calif. 95076; Robert S. Smith, San Jose, Calif.

[73] Assignee: Allison L. Rider, Watsonville, Calif.

[21] Appl. No.: 694,826

[22] Filed: May 2, 1991

Related U.S. Application Data

[63] Continuation-in-part of Ser. No. 399,844, Aug. 29, 1989, Pat. No. 5,013,435.

[51] Int. Cl.$^5$ .................. B29C 53/08; B01D 21/02
[52] U.S. Cl. ...................... 264/339; 210/262
[58] Field of Search ............ 264/339, 219, 220, 225, 264/226, 227; 210/262, 265, 304, 521, 537, 802, 522, 312, 261

[56] References Cited

U.S. PATENT DOCUMENTS

| | | | |
|---|---|---|---|
| 644,047 | 2/1900 | Almquist | 210/312 |
| 838,129 | 12/1906 | Mikolasek | 210/312 |
| 1,458,805 | 6/1923 | Christensen | 210/521 |
| 3,613,889 | 10/1970 | Reed | 210/522 |
| 4,221,671 | 9/1980 | Meurer | 210/522 |
| 4,589,984 | 5/1986 | Legrand et al. | 210/522 |
| 4,783,255 | 11/1988 | Bogusch | 210/522 |
| 4,844,819 | 7/1989 | Norman | 210/801 |
| 4,883,603 | 11/1989 | Roggenstein et al. | 210/802 |
| 5,013,435 | 5/1991 | Rider et al. | 210/262 |

FOREIGN PATENT DOCUMENTS 353130 9/1903 France.
757174 8/1980 U.S.S.R..

*Primary Examiner*—Tim Heitbrink
*Attorney, Agent, or Firm*—Jacques M. Dulin

[57] ABSTRACT

Apparatus and method for removing particulate impurities from liquids wherein the liquid flows upward through a bundle of tubes having a helical shape to present an inclined path where settling of particulates back down the tube occurs. The bundle is preferably formed around a central standpipe. This modular helical tube bundle arrangement provides a compact and inexpensive structure and great convenience for maintenance. The preferred cross sectional shape of each tube is oval to increase settling rate. In order to form the tubes from rigid tubing, a concrete form is made in accordance with a procedure which includes forming a "tent" of strings, sculpting a plasticene negative form using the tent of strings as a guide, casting concrete against the form to produce a mold that resembles a sliding board with an outside drooping edge. In a preferred apparatus the tube bundle is foamed in place within a cylindrical tank and the bundle supports the standpipe, which in turn may carry a motor and propeller assembly for break-up of bubbles forming within the reaction zone portion of the settling tube.

13 Claims, 5 Drawing Sheets

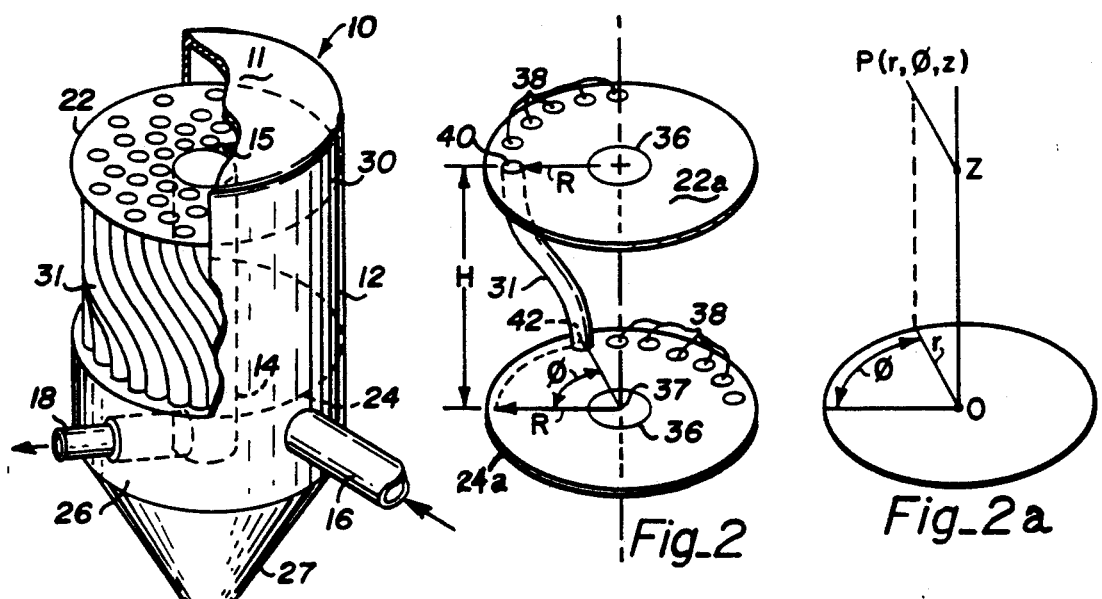
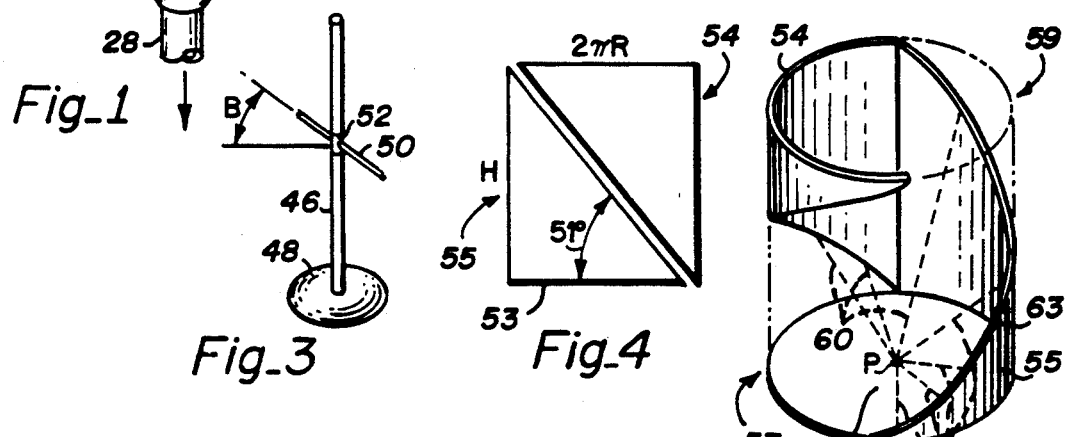
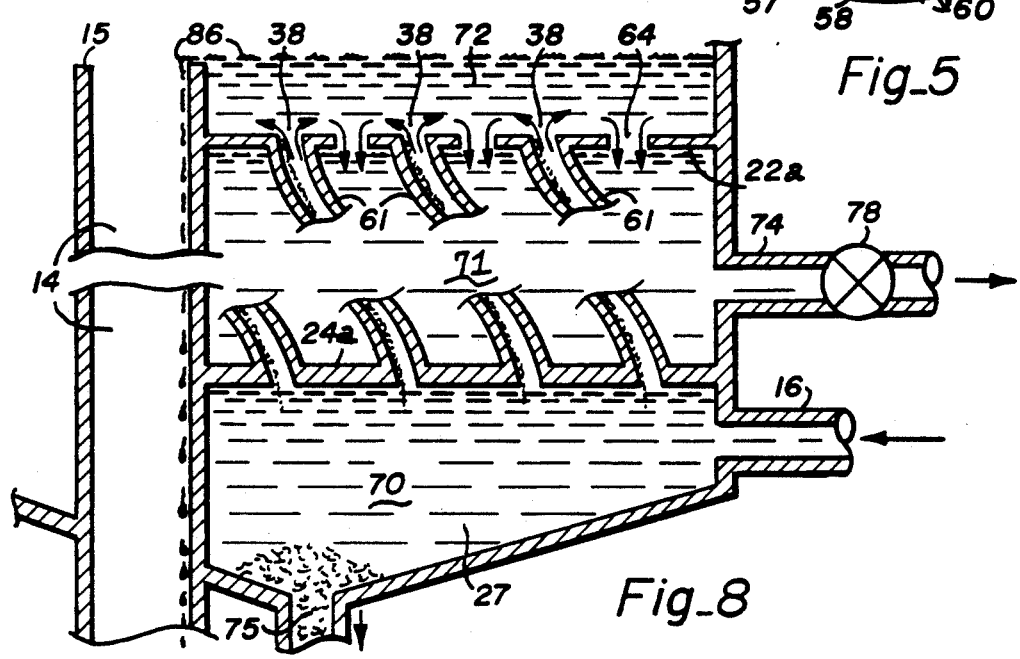

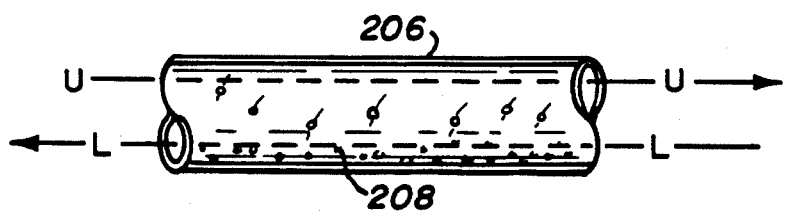
Fig_6
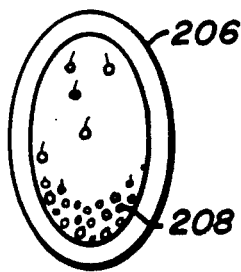
Fig_7
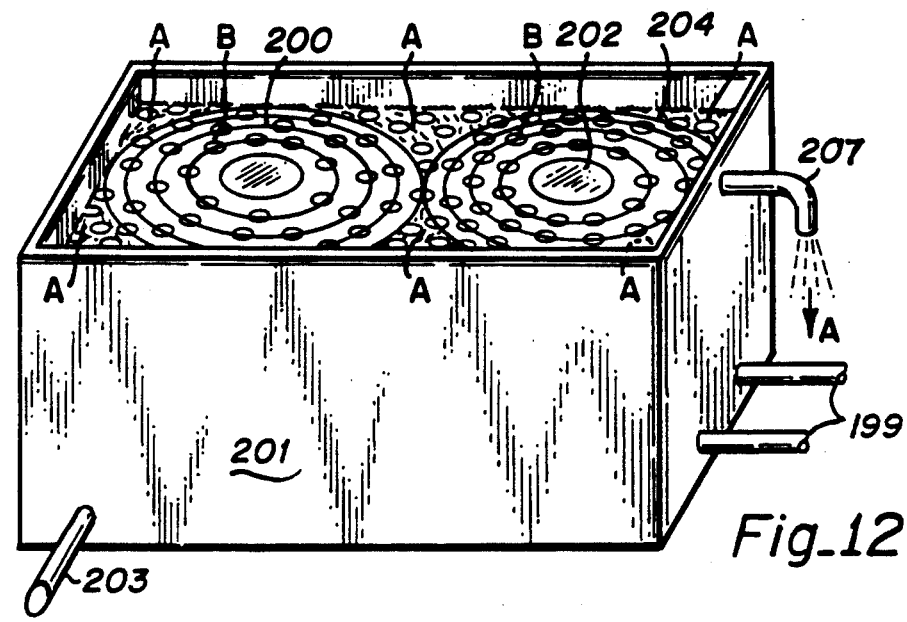
Fig_12
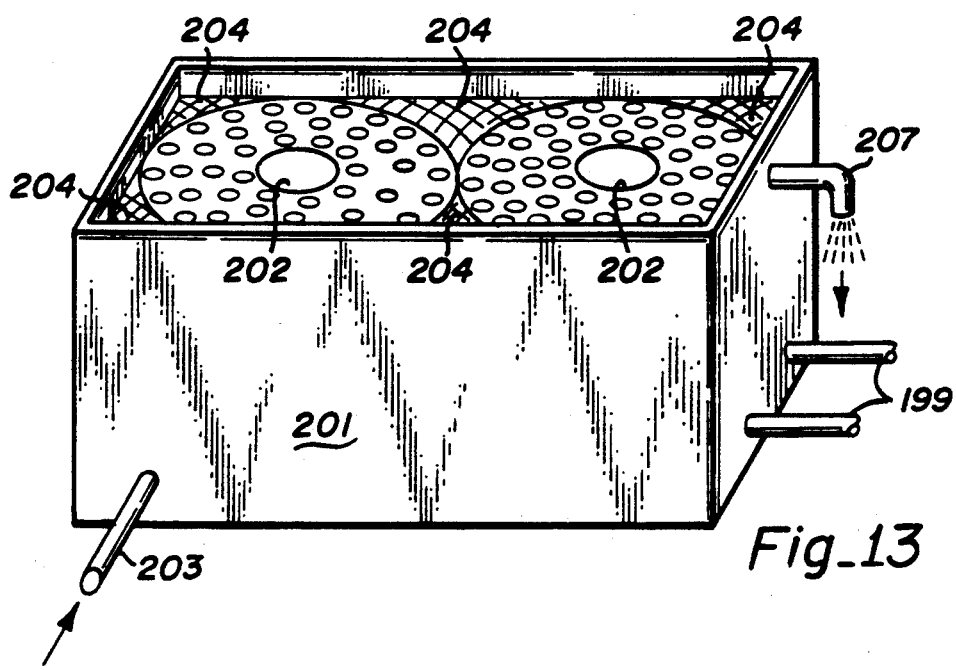
Fig_13

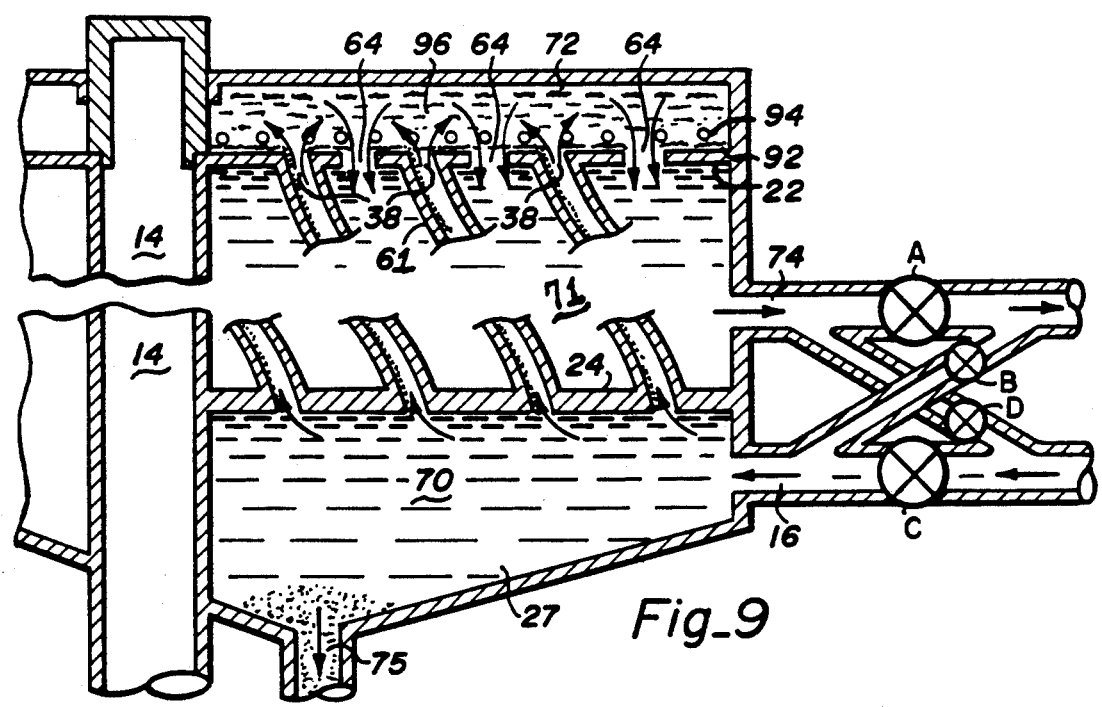
Fig_9
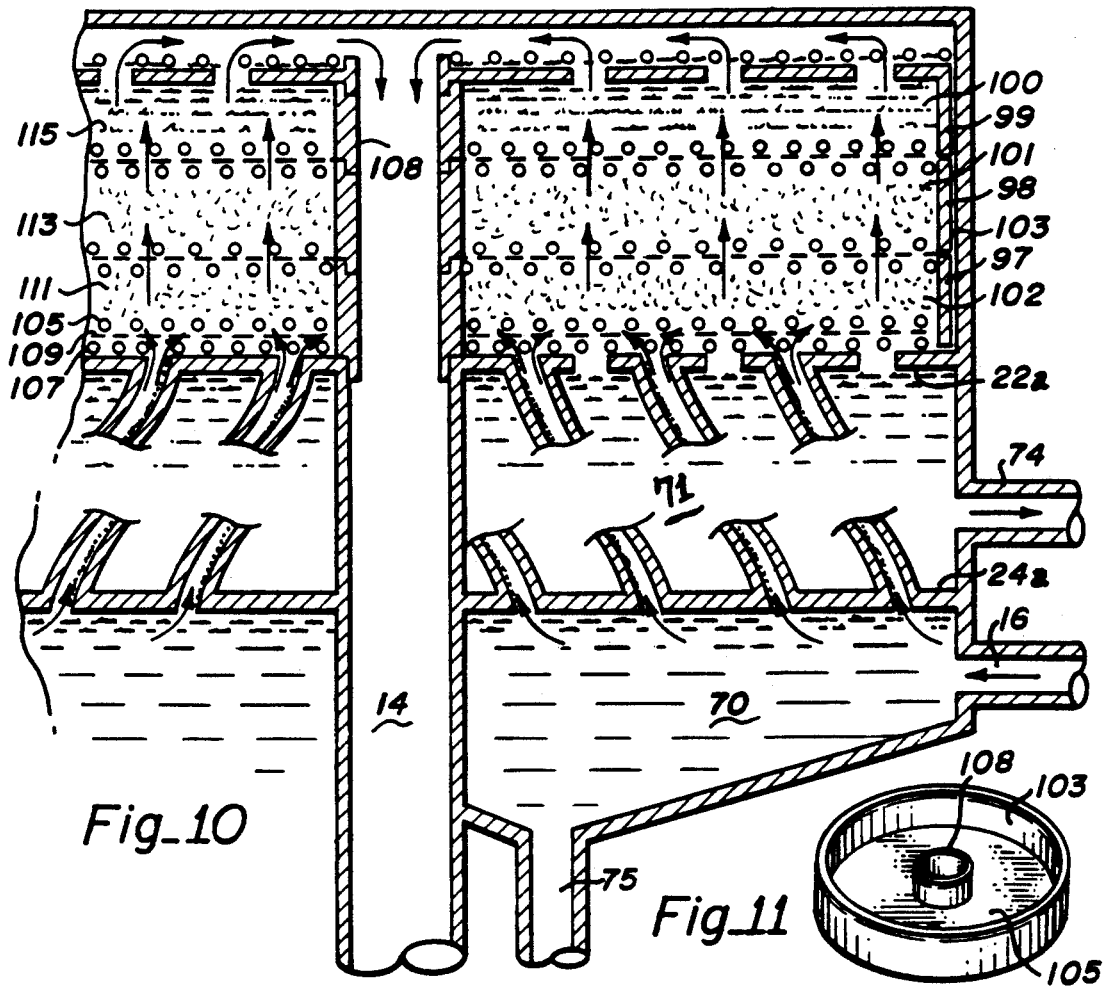
Fig_10
Fig_11

METHOD FOR MAKING A BUNDLE OF HELICAL TUBES AND APPARATUS FOR SEPARATING IMPURITIES FROM A POLLUTED LIQUID

CROSS REFERENCE TO RELATED APPLICATIONS

This application is a continuation-in-part of our prior application Ser. No. 399,844 filed Aug. 29, 1989, now U.S. Pat. No. 5,013,435, issued May 7, 1991, the benefit of the filing date of which is claimed under 35 USC 120.

FIELD OF THE INVENTION

This invention relates to systems for purifying liquids such as water and in particular to systems having containers with inclined tubes to accelerate settling of particulates to the bottom of the container as liquid flows to the top.

BACKGROUND

The problem of purifying liquids such as water is complicated by the fact that liquids can be contaminated by a variety of agents and removal of each agent requires a special technique. For example, particulates may be removed by settling techniques. Liquid organic contaminants may be removed by flushing water through a bed of activated carbon. Negative ions such as chlorine are removed by flushing the water through a "strong base" ion exchange resin whereby the resin gives up a hydroxyl radical and absorbs the negative ion. Ions of heavy metals or calcium are removed by flushing the water through a bed of "strong acid" ion exchange resin whereby the resin gives up a hydrogen ion and absorbs the metal ion. Another method of removing heavy metal ions is to raise the pH in order to precipitate heavy metal oxides.

A method developed by the Unocal Corporation, called the UNIPURE PROCESS, does not depend on raising the pH of polluted waters in order to precipitate the heavy metal ions. The process is based on a technique of precipitating iron in an activated state that absorbs heavy metal ions An agent is then added to the water to flocculate the precipitate. Finally, the flocculant is separated from the pure water, usually by settling in a settling tank.

An important problem associated with the addition of precipitating agents (such as lime, ammonia or oxygen) to form a floc is the generation of gases that form bubbles in the sludge. Since the general approach to removing the sludge is by settling, the presence of bubbles greatly impedes the settling since the bubbles are trapped by the flocs and remain suspended or actually rise instead of settle.

Many water purification systems comprise separate components such as a settling tank followed by a bank of cylinders containing activated carbon and then finally a bank of cylinders containing the resins. These systems typically require a lot of space and are expensive to build and maintain in as much as a considerable amount of plumbing is involved. In many operations, considerable expense has already been invested in tanks, etc. which deter the owner from investing in improved equipment.

It is known in the art to force liquid to rise through an inclined tube in order to accelerate the settling of particles suspended in the liquid to the bottom of the tube It is found that by inclining the tube at an appropriate angle, the rate of settling is greatly accelerated The most effective angle can vary somewhat, depending on current (rate of flow) and nature of the suspended particles (particle size, state of agglomeration, etc.). It has been found that the most effective angle of inclination is about 50°.

If a settling tank is constructed with straight tubes in an erect cylindrical or rectangular tank, the requirement for inclining the tubes results in there being a substantial amount of the tank space and surface not being used. Therefore, tanks have been built with slanted sides although this construction is expensive and requires considerable space. The flow of the fluid through the tube is laminar, i.e., the velocity of the stream varies with distance from the lowermost inner surface of the tube. The more dense layer of liquid is on the lowermost side of the tube where particles have accumulated so that liquid actually flows downward carrying the particles down the incline while cleaner, less dense liquid flows upward and along toward the top most side of the tube.

U.S. Pat. No. 4,589,984 to Legrand et al discloses a settling tank for separating oil, water and sludge comprising a parallel connection of settling regions, each region having a sloped bottom for particulate separation under a bundle of vertical tubes to separate the oil from water.

U.S. Pat. No. 4,221,671 to Meurer discloses a construction of strips of corrugated sheet, where the corrugations are parallel to the direction of flow. Each strip comprises a series of short straight corrugated sections connected end to end to form a helix The helices are interleaved with one another so as to fill most of a cylindrical container.

The Meurer patent also discusses a settling tank comprising an array of tubes wound helically around a central stand pipe in which the tubes are arranged as concentric circular layers, where the diameter of the tubes of each outer layer is successively larger than the tubes of the next inner layer. It is pointed out that each layer of tubes would have different flow characteristics than neighboring layers The same patent discloses layers of helically wound tubes having the same diameter but states that "the problem of having to curve the tubes differently in each row is manifestly impractical".

U.S. Pat. No. 3,613,889 to Reed discloses a system where bundles of inclined tubes are floated on the top of the surface of the tank so that changes of the liquid level in the tank can be accommodated.

U.S. Pat. No. 4,783,255 to Bogusch discloses a settling device comprising straight channels where each channel has a cross-section resembling a boomerang.

THE INVENTION

Objects

It is an object of this invention to provide a settling tank of the type that has inclined surfaces that are especially constructed to accelerate settling of particulates in a liquid.

It is another object of this invention that the top surface area of the tank containing inclined tubes be completely utilized rather than partially utilized as is the case with straight inclined tubes in an erect cylindrical tank.

It is another object of this invention that the flow of liquid up through each tube be uniform with respect to the other tubes.

It is another object of this invention to provide a means for economically and accurately fabricating the tubular elements that comprise the construction of this tank.

Yet another object of this invention is that the flow across the open top end of each tube be relatively uniform with respect to the other tubes.

Still another object of this invention is to provide a device that can be installed into an existing settling tank that will increase the settling rate to the fullest capacity of the tank given the dimensions of the tank.

It is a further object of this invention to provide an apparatus that combines settling, ion exchange and activated surface absorption features in a single construction that is efficient, economical, and convenient to operate.

A further object is to provide an apparatus that combines precipitation, flocculation and settling in a manner that releases trapped gases generated by the precipitation step and compacts the sludge more effectively than is achieved with devices of the prior art, and is efficient, economical and convenient to operate.

DRAWINGS

FIG. 1 shows a perspective view of one embodiment of a settling tank of this invention with portions cutaway to show the helical tube assembly.

FIG. 2 shows in perspective a single helical tube.

FIG. 2a illustrates polar coordinates according to standard terminology of analytical geometry as they are used to describe the locations of a point, P.

FIG. 3 shows in perspective a stand that is a useful aid for forming a tube.

FIGS. 4 and 5 illustrate a method for making a permanent mold to form the tubes.

FIG. 6 illustrates distribution of density in the liquid due to particulates in an inclined tube.

FIG. 7 shows a section of tube having an oval cross-section.

FIG. 8 shows in vertical cross-section an embodiment of the settling tube assembly of the invention for separating immiscible liquids such as water and oil.

FIG. 9 shows an embodiment of the invention in which the liquid passes upward through a filter after settling of particulates has occurred.

FIG. 10 shows an embodiment in which treatment media such as activated carbon and ion exchange resins are used.

FIG. 11 shows an embodiment of the invention illustrating construction of a basket, a stack of which, comprises the compartmentalized construction of FIG. 10.

FIG. 12 shows two bundles of tubes positioned in a rectangular tank where areas in the corners are filled with short tubes.

FIG. 13 shows two bundles of tubes positioned in a rectangular tank with a cover over open corners areas to direct flow of liquid through the tubes and over a weir along the top edge of the tank.

SUMMARY

Figure 14:
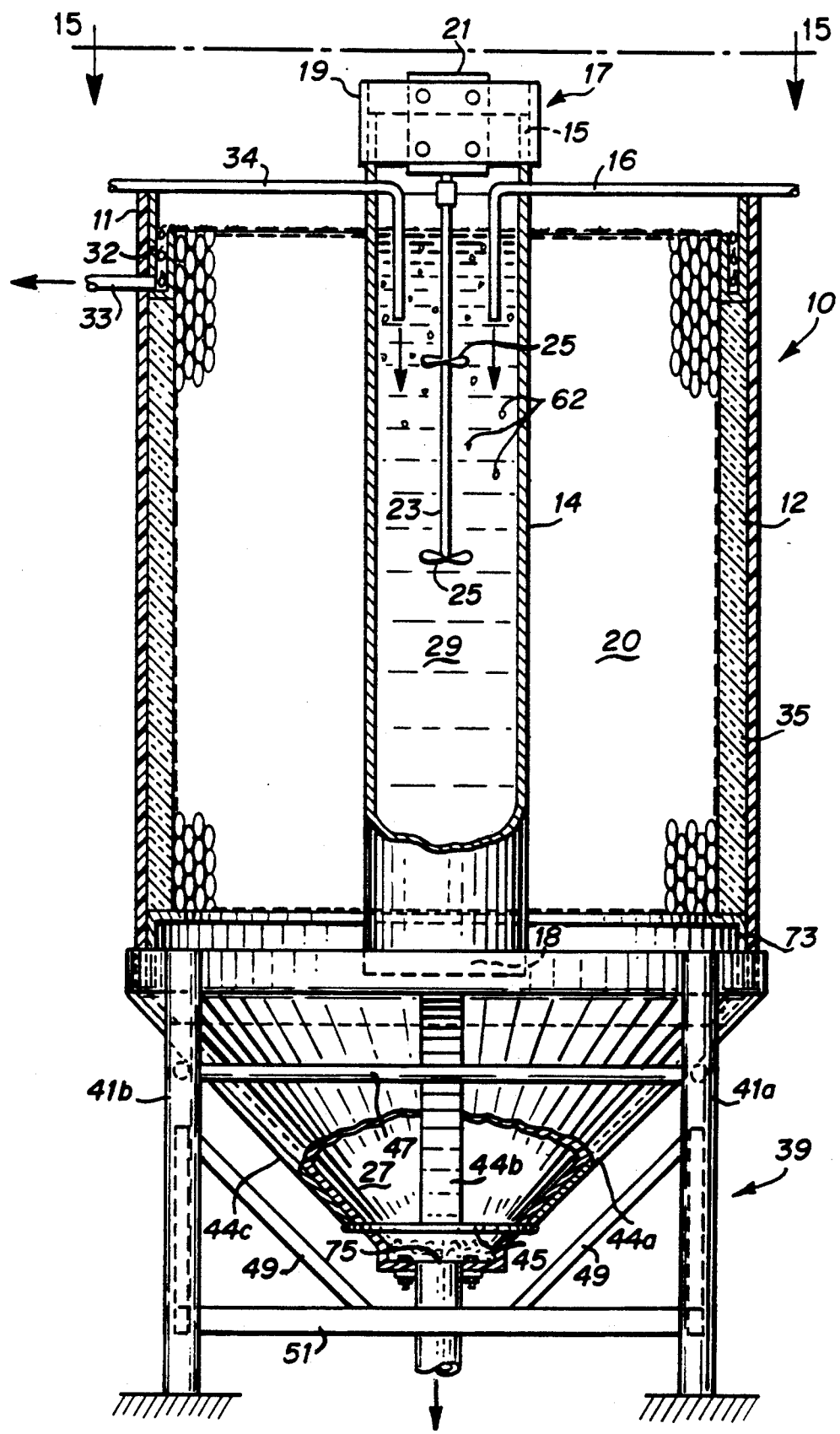
FIG. 14 shows in vertical elevation, partly in section, a preferred embodiment of the tank plus helical tube apparatus of this invention.

This invention is directed toward an apparatus, which clarifies and purifies liquids, and its method of construction and use. One feature of this invention includes an array of contoured inclined tubes each tube having a cross section optimized and arranged to increase settling rate of particulates. The construction of the array is designed to reduce requirements for space. Other features include use of adjoining sections for further purification (removal of ions, organic contaminants, etc.) that provide for convenient and efficient operations.

In one embodiment the settling tank assembly of this invention comprises an array (bundle) of tubes housed in an upright, generally cylindrical tank enclosing a coaxially positioned cylindrical standpipe. The tubes are partially wound as helices around the standpipe All of the tubes have equal lengths and identical, preferably oval, cross-sections.

Liquid is forced into the bottom and out the top of each tube while, simultaneously, particulates settle from the liquid inside the tube and slide back down the tube to the bottom of the tank.

In another embodiment, in order to retrofit an existing rectangular tank and convert it to a settling tank having the features of the invention, one or more bundles of helical tubes, each bundle having an overall (outside) rectangular shape, is installed in the tank. By this construction, most of the tank is filled with inclined tubes in contrast to the prior art practice of installing straight inclined tubes into a tank in which case a large volume of the tank is not utilized for accelerated settling. The outside rectangular shape of each bundle is achieved by filling up the space in the corners of the tank with shorter lengths of tubes to form the helix. However the slope of each shortened helix with respect to the (horizontal) floor of the tank is maintained at 51°±. Of course these shortened tubes in the outside corners do not extend from the top of the tank to the bottom.

Another construction for retrofitting an existing tank is to install one or more cylindrical bundles of helically wound tubes in the tank as described in the foregoing paragraph and position a cover over those areas of the top surface of the liquid not occupied by the upper ends of the tubes so that all of the liquid is forced to rise up through the tubes (rather than around the side of the bundle) and flow across the cover to the weir at the top edge of the tank.

A preferred cross section of each tube is oval where the smallest axis of the oval is horizontal. This provides a much steeper density gradient in the liquid because the sides of the oval shaped tube "funnel" the particulates into the lowest cusp of the oval in contrast to a tube having a circular cross-section A ratio of major to minor axis of the oval greater than 1.1 to 1 improves the rate of settling.

In one construction, the lower end of each tube is secured in an aperture in a false bottom (distribution plate). Particulate laden liquid enters the lower ends of the tubes through the holes in the lower side of the false bottom and passes up through the tubes during which time settling occurs and clarified liquid exits out the top ends. Then the clear liquid passes down the outside of each tube and out of an outlet in the cylindrical side of the tank that is just above the false bottom The advantage of this construction is that the distance the liquid must flow across the top ends of the tubes in order to reach the downward passage is approximately the same for all the tubes Therefore, the upward current in all the tubes is approximately uniform.

If the settling tank is intended to fractionate sludge containing particulates and immiscible liquids such as oil and water, then the false bottom construction disclosed in the previous paragraph is used and an open top end of a central standpipe extends above the plane defined by the upper ends of the tubes. The flow rate is controlled so that particulates are removed by settling as the liquid rises through the tubes and passes into the region above the top ends of the tubes. Oil rises in that top region and is skimmed off by passing back down through the standpipe while the heavier water escapes through the openings between the tubes and out an exit port just above the false bottom as described in the foregoing paragraph.

In a further embodiment of this construction, a flat membrane filter may be pressed by a coarse screen against the plane formed by the upper ends of the tubes so that very fine particulates that have not been removed by the settling process are caught by the filter after which the filtered liquid escapes as described above. Advantages of this arrangement are that the filter does not become clogged with large particles; the entire top surface of the tank is used for filtration; flow through the filter is uniform across the entire top surface of the tank; a filter can be changed very easily since it need only be removed from the top of the tank where there is not a large head of liquid rather than at the bottom of the tank.

In yet another embodiment, the region above the filter may be loaded with a bed of ion exchange resin beads so that after settling of particulates in the tubes, the clarified liquid carrying ions, would pass up through the bottom of the ion exchange bed where the ions would be absorbed by the resin and the de-ionized liquid then passes down and out through the central standpipe The advantage of this arrangement over the prior art arrangement of water passing down through cylinders containing columns of ion exchange resins is that the resins do not become "packed" so as to restrict flow of the water.

In another embodiment, a stack of baskets is placed in the region over the top ends of the tubes. Each basket comprises a cylinder whose flat bottom is a filter with an opening in the center so that the cylindrical basket will fit the stand pipe An appropriate treatment medium—activated carbon, strong base resin or strong acid resin—is placed in each basket. A filter is placed over the top of the top basket. Liquid passes successively through the tubes and up through the bottom of each basket up through the top filter then down the central standpipe so that each component of contamination (organics, ions, etc.) is removed in succession.

Yet another embodiment is useful to remove heavy metal ions in an apparatus which combines precipitation, flocculation and settling The polluted liquid, precipitating agent and/or flocculating agent are introduced into the open top of the central standpipe of the tank, and precipitation and flocculation take place in the standpipe. The components are mixed by a motorized stirrer (propeller) on the end of a rotating rod that is supported on the standpipe and positioned down the center. The mix passes downwardly and out from the bottom of the standpipe, and then up through the helical inclined tubes wrapped around the standpipe core. Clarified liquid passes out of the top of the tubes to a circumferential weir adjacent the side of the tank while particulate matter sludge slides back down the tubes and out of the conical bottom of the tank.

In addition to mixing, the propellers break up bubbles that may be formed by some precipitation reactions, and which otherwise might be trapped by particulates so as to impede settling. The gas is thereby able to escape out of the top of the standpipe while the liquid (including any floc and/or particulates) passes down the standpipe into the settling/sludge collection zone in the cone below. This feature is especially effective when the precipitating agent is a calcium compound (lime) or a gas such as air or ammonia. The standpipe is both a reaction and degassing zone.

The propeller rotation imparts a vorticular flowpath to the sludge in the bottom settling region below the end of the standpipe which is an aid to separating the sludge that accumulates in the bottom region from the liquid so that the liquid passes up the inclined tubes The settled sludge is withdrawn out of an exit port in the vertex of the conical bottom. The propeller shaft can be any suitable length, and preferably extends to about midway down the standpipe.

The method to be used in constructing the array of tubes depends on the properties of the tube, i.e., flexibility, etc.

One method to build the helically wrapped bundle, applicable to the case where the tubes are flexible plastic (e.g. polypropylene, polyethylene, etc.), is to secure them to the standpipe (as by tying). The first tube at each end to the standpipe using a special inclination stand to align the entire length of tube to the required inclination. Then the next tube is wrapped around the standpipe tangent to the first tube and "welded" to its neighboring tube using a hot air welding gun. In this manner the entire bundle of tubes is fabricated using the inclination stand to ensure required inclination as each tube is added and welded to its neighbor.

Alternately, the tubes may be adhered to each other by application of a foamed-in-place type of urethane foam which sticks to the plastic tubes and cures to a rigid condition. The resulting assembly is a "monoblock", in that the tubes are adhered to each other and to the standpipe. The resulting tube bundle may be dropped in place in the tank by suspension from the top of the standpipe, and once in place in the tank, the tube/standpipe/foam monoblock supports the standpipe/motor assembly.

Another method of fabricating the bundle of tubes is also applicable to the case where the tubes are flexible and is especially useful where it is desired to maintain space between neighboring tubes in order that there be downflow outside the tubes as described in foregoing paragraphs. According to this method of construction, two disks are supported coaxially on opposite ends of a standpipe. The diameter of the disks is at least equal to the diameter of the containing tank into which the bundle of tubes is to be positioned ultimately. Each disk has an array of holes arranged in circles concentric with the central standpipe. Starting with the first (innermost) layer of tubes to be wrapped around the standpipe, one end of each tube is secured in a hole in each disk The two holes for each disk are located at distance R from the axis of the standpipe. The hole in the top disk is angularly displaced by an angle $\phi$ (in radians) from the hole in the bottom disk so as to satisfy the expression:

$$H = R(\tan B)\phi, \text{ or } \phi = \frac{H}{R(\tan B)}$$

where H is the vertical separation of the disks, B is the angle of inclination of the tubes and $\phi$ is the angular coordinate measured circumferentially around the disk.

When the tubes are rigid plastic at room temperature, then tubes may be softened by heat then formed against a mold surface. The mold surface is made by the following procedure:

1. An array of strings is formed in which one end of all the strings is attached to a common connecting point The other ends of the stretched strings define a helix lying on a cylinder whose axis passes through the common connecting point of all of the strings. The base of the cylinder also passes through the common connecting point. The radius and height of the cylinder are immaterial as long as they are at least as large as the outside radius and height of the bundle of tubes to be formed. The slope of the helix with respect to the base is tan B. (The preferred value of angle B is 51°)

2. Using the array of strings as a pattern, a sculpture is formed by filling the space between the cylinder base and surface defined by the array of strings with a sculpting compound such as modeling clay. After the sculpture is formed, the array of strings is removed.

3. A series of parallel helical ridges is formed in the sculpted surface which form concentric helices and will eventually serve as guides for the tubes to be formed.

4. Concrete is cast against the plasticene sculpture to provide a permanent form having the grooved permanent surface against which the tubes may be formed.

To form each plastic tube to the desired helical shape, each tube is cut to a common length and rendered ductile by heating, such as passing hot air into the tube. The ductile tube is pressed in a groove against the molding surface to form the required shape of helices. Then coolant, such as cold water or air, is passed through the tube in order to render the tube rigid.

Layers of helically arranged tubes are assembled around a central standpipe wherein the pitch of the helix of tubes in each helical layer is greater than the pitch of helices having a smaller diameter.

DETAILED DESCRIPTION OF THE BEST MODE

The following detailed description illustrates the invention by way of example, and not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a cutaway view of one embodiment of a settling tank 10 of this invention. The settling tank comprises a cylindrical container (tank) 12 having a central cylindrical standpipe 14, the top end 15 of which terminates below the tank top 11. Layers of tubes 31 are wound around the central standpipe so that the top open ends of the tubes lie in an upper top plane 22. The bottom ends of the tubes are secured to lie in a lower bottom plane 24. Top plane 22 is below the upper end of the standpipe. Liquid carrying particulates to be removed enters a bottom region in the container through a pipe 16 that is just below the bottom plane 24. Preferably, the particulate laden liquid is forced into the bottom of the tank in a horizontal direction that is generally tangential to the cylindrical tank wall and counter to the pitch of the helically wound tubes 31. This creates a vorticular pattern of flow in the entry area. The liquid passes up through the tubes which are all inclined at an angle of 51°±. Inside each tube 31 lamellar flow of the liquid is generated causing settling of the particulates toward the lower surface area inside the tube. The particles slide back down the tubes to the lower entry region 26. The collected particulates form a sludge and may be removed through bottom discharge pipe 28 at the base of conical setting section 27. The liquid (having been purged of particles) continues up through the tubes out into the upper zone 30, from which it is withdrawn down through the central standpipe 14 and exits through pipe 18.

Since each tube is inclined along its entire length at a constant angle (substantially 51°) with respect to the horizontal plane, each tube forms a helix coaxial with the central standpipe. The bundle of tubes wrapped around the central standpipe comprises layers of concentric helices where each concentric layer comprises helices with a common radius. All of the tubes 31 in the entire array will have the same length.

It may be noted from first principles of calculus that, the length of any tube in the bundle is H/sin B and is therefore independent of the radius of the helix. B is the angle of constant inclination which the helix makes with its bottom plane, 24. The preferred value of B is 51°. H is the distance between the ends of the cylindrical bundle.

FIGS. 2–5 illustrate several practical methods by which this settling tank may be built. The selection of the most appropriate method depends on the properties of the liquid that is being treated which determine the type of material from which the tubes are made. Two methods of fabrication that are described are applicable to the use of flexible tubes and a third method is applicable to the case where the tubes are rigid. For example, a semi-flexible polyethylene tubing may be used for operating temperatures up to about 180° F. If the liquid is hotter, then the tubes should be composed of more thermally resistant material.

Referring now to FIG. 2, to fabricate the settling tank using semi-flexible tubes, a top disk 22a and bottom disk 24a are shown (top disk 22a and bottom disk 24a are coincident with top plane 22 and bottom plane 24, respectively). Each disk has a diameter equal to that of the cylindrical container and a large central hole 36 to accommodate the central standpipe. Each disk also has an array 38 of smaller holes. The array 38 is shown in phantom in FIG. 2 except for hole 40 in the top disk and hole 42 in the bottom disk. An end of tube 31 may be secured in holes 40 and 42 in each disk by a number of techniques such as by inserting a short bushing into the tube which expands the end of the tube against the inside of the hole. The number of holes spaced a given radius, R, from the center 37 of the disks depends on R. All of the tubes are cut to the same length, H/sin B. As shown in FIG. 2, each tube, has one end secured in a hole 42 in the bottom disk that is a distance R from the disk axis. The other end is secured in a hole 40 in the top disk that is angularly displaced about the disk axis with respect to the hole 42 in the bottom disk by the angle $\phi$ (in radians), where:

$$\phi = \frac{H}{R \tan B}$$

B is the desired angle of inclination and is generally found to be 51°±. H is the distance between the top and bottom disks.

A second method of forming the bundle of tubes is to begin by wrapping the first tube around the standpipe and securing the tube at each end to the standpipe. The angle stand is used to adjust the inclination of the tube along its entire length. Securing the tube against the standpipe can be accomplished, e.g., by using an appropriate glue or tying each end to the standpipe. Then the next tube is wrapped around the standpipe adjacent to the first tube and is held in position by welding the tubes together with a hot air gun. After the first layer of tubes is completed, the second layer is laid using the same procedure and so on until the entire bundle is complete.

The entire bundle of tubes is assembled layer by layer using the "angle stand" shown in FIG. 3. The angle stand is an aid in assembling the bundle of tubes by ensuring that each tube is inclined at the desired uniform angle. The angle stand comprises a vertical support rod 46 standing on a base 48 and having an incline bar 50 attached to a collar 52 that slides on the vertical support bar 46. The incline bar is set at the angle B required for the inclination of the tubes. The first innermost tube is wrapped around the standpipe using the angle stand as a guide and secured at each end as described above. The inclination all along the length of the tube is adjusted to the required value using the incline bar as a guide by sliding the incline bar along the vertical support and tube as required. Each layer of tubes is completed followed by the next outermost layer until the entire array of tubes is complete. A complete bundle of tubes having a circular cross section is illustrated in FIG. 1.

Another method of fabricating the tubes is applicable where the tube is rigid at room temperature. In order to form the tubes, a molding form is fabricated having a shape that resembles a spiral (helical) sliding board where the outer edge of the sliding board droops downward. Any point on the molding surface obeys the relation:

$$Z = r\phi(\tan B)$$

where r, Z and $\phi$ are polar coordinates defined in FIG. 2a in accordance with standard terminology of analytical geometry. Helical grooves concentric with the axis are formed on the surface of the mold which serve as guides for forming each of the tubes. In order for the rigid tube to acquire the desired helical shape, it is softened by heat, such as by radiation, or from a hot air blower or hot water circulated in the tube, and then laid in the appropriate helical groove on the surface of the mold. The equation of a groove having a given radius Rn along the helical surface is determined by setting r=Rn and solving for Z for a succession of values, $\phi 1$, $\phi 2$, $\phi 3$ - - - $\phi m$ where $$Z(n,m) = (Rn)(\phi m)(\tan B)$$

From a practical standpoint, it will be recognized that the molding surface need not be made to close machine tolerances, and that a suitable material for the mold may be concrete. Therefore, one method for fabricating the mold may be to perform the following steps.

The first step is to form a sculpture in a putty-like medium such as plasticene (which is well known to sculptors for such purposes) which has the final shape of the negative mold surface. Formation of the sculpture is illustrated in FIG. 4 and 5. As shown in FIG. 4 the first step in preparing the mold is to form from a sheet two right triangles 54 and 55 by cutting along the diagonal of a rectangle whose one side is length H, and whose other side 53 is length $2\pi R$. (R is at least as great as the radius of the bundle of tubes.) In step two (FIG. 5), one sheet 55 is rolled so that the first corner meets the right angle to provide a lower half of a container 57 (or form) for the sculpture, and the second sheet 54 is rolled so that the other corner meets the right angle to provide an upper half container 59 for the final casting. In step three, the container 57 for the sculpture is set on its circular base 58 and a number of cords 60 are stretched from the center of the base 58 to the curved gap 63 between the upper and lower halves of the structure. The st-retched cords are shown as dashed lines in FIG. 5. The mold surface is the locus of the cords, which is termed herein a "tent".

In step four, a sculpture is built under the "tent" of stretched cords with the cords marking the top bounding surface of the sculpture using a "putty-like" sculpting compound such as plasticene. "V" shaped ridges are then formed in the bounding surface to form helical ridges that are concentric with the central axis and each other (each helical groove has a constant helical radius). As shown in FIG. 5, the casting container 59 is placed over the molding form 57 and concrete is poured into the open top end of the container 59. The plasticene is then scooped away from the concrete casting to leave a concrete cylinder having an end bounded by the required grooved helical surface.

The finished concrete mold is used to shape the initially straight tube into a helix. This requires that the tube first be softened by heat, such as by running hot air or hot water through the tube. Then the tube is laid in the appropriate groove on the concrete mold surface and cooled so that it becomes rigid.

FIG. 6 and 7 illustrate the effect of cross-sectional shape on the settling dynamics of the inclined tube. FIG. 6 is a plan view and FIG. 7 is a cross-sectional view of a length of inclined tube 206 showing particles 208 under the influence of gravity, drifting toward the lower most surface of the tube, i.e., along line L—L. While we do not wish to be bound by theory, we believe that the collection of particulates along this lower line causes the density of the liquid along this line to increase so that there is a net flow of liquid containing particles in the downward direction in this area while the liquid in the upper region (line U—U) tends to flow in the upward direction. Thus, the bi-directional flow of liquid occurs as a result, of the applied pumping force on the liquid at the lower end of the tube combined with the effect of the denser liquid displacing the lighter liquid in the tube.

FIG. 7 is a cross-sectional view of a tube 206 having an oval shaped cross-section which clearly shows that the sloping sides of the oval funnels the downward drift of the particles. The particles thereby concentrate on the bottom cusp of the oval increasing the differences of density of liquid from the top to the bottom of the tube. The funneling—concentrating action is greater with greater ratio of depth to width of the oval. Accordingly, it is an embodiment of this invention that the settling tank comprises tubes having an oval shaped cross-section. The oval construction can be achieved by using flexible plastic to fabricate the tube since the tube will partially collapse laterally on being constrained to the helical shape. It is thus an embodiment of this invention to construct a settling tank following procedures and incorporating features discussed above in addition to which, the tubes have an oval shaped cross-section.

FIG. 8 is a cross-sectional view illustrating another embodiment showing the top ends 61 (three are shown) of the tubes secured to the top plate 22. The top disk 22a has holes 64 in addition to the holes 38 that enclose tube ends 61. The bottom disk 24a serves as a partition that separates clarified liquid flowing from the top region 72 into the intermediate region 71 from liquid entering into the bottom region 70 through entry port 16. Liquid flows through entry port 16 into the bottom region 70, up through the tubes, whose top ends 61 are shown, into the top region 72 then down through holes 64, past the outside of each tube and out of an exit port 74 just above the bottom disk. One advantage of this arrangement is that horizontal flow parallel to the top disk in the top region is more uniform than when the central standpipe is the collection orifice for liquid from all of the tubes. In this arrangement, the standpipe 14 may be open to accept overflow or it may be covered over.

As shown in FIG. 8, when the top end 15 of the standpipe extends above the plane of the top ends of the tubes, then the construction is useful for fractionating sludge that contains immiscible liquids such as oil and water as well as particulates. The particulates settle out of the sludge as the sludge moves to the top of the tubes and the collection of particles is removed from the bottom sludge exit port 75. Flow is controlled by valve 78 so that liquid collects in the top region 72 above the tube ends. Oil 86 rises to the surface of the top region 72 and overflows the top 15 of the standpipe, i.e., oil is skimmed off and passes down the standpipe 14 while the more dense water escapes down the outsides of the tubes and out the "clean water" exit port 74.

In FIG. 9 is shown another embodiment, useful where the incoming liquid contains:

a) large particles that can settle by laminar flow in the tubes;

b) very fine particles that are too fine to be removed by settling in the tubes, or c) where it is desired to treat the clarified liquid with particulate agents such as ion exchange resin to remove ions or activated carbon to remove organic (liquid) contaminants.

The construction involving tubes, top disk, bottom disk, etc, is essentially the same as that shown in FIG. 8, and identical parts are identified by identical numbers. However, in FIG. 9 in addition, a membrane filter 92 is secured on the top disk by a coarse screen 94. The fine particulates are trapped on the bottom side of the filter by liquid emerging from the tubes. A treating medium 96 (ion exchange resin, activated carbon, etc) may be placed in the region above the filter.

An important feature of this arrangement is that the fine particles are trapped on one side of the filter (the underside) while the treating medium is on the top side. This makes it possible to clean the filter (the underside) while the treating medium is supported on the topside. Therefore the fine particles do not contaminate the treating medium and makes it possible to clean the filter when it becomes clogged without disturbing the treating medium. In order to clean the filter, direction of flow may be reversed to back flush the filter. This is accomplished by the valving arrangement shown in FIG. 9 which shows a partial cross sectional view of bottom region 70, entry port 16 and clean water drain 74. Valves B and D are closed and A and C are open when the system is operating in the normal mode. Valves B and D are open and valves A and C are closed when the system is operating in the "back flushing" mode.

The arrangement shown is particularly advantageous for the incorporation of ion exchange resins or activated carbon granules because the current out of the top of the tubes, through both sides of the filter then down the outside of the tubes, is of such turbulent nature in top region 72 that the granules do not "pack" over a period of time. "Packing" of resin or activated carbon is a very important factor in the loss of performance of these materials.

Another important feature of the construction shown in FIG. 9 is the ease of removing the resin or carbon. Changing resins or activated carbon with systems of the prior art is a very messy job because of the amount of plumbing, etc., involved and therefore many users simply rent cylinders containing charges of resin or carbon and exchange them when the charge is "spent". However, with the construction of this invention, the resin or carbon is removed simply by opening up the top of the standpipe so that the spent charge is washed down and out the bottom of the standpipe. Fresh resin or carbon is added through a door in the top of the container (not shown).

If the requirement is to remove a variety of constituents, such as particulates, organic compounds and positive and negative ions, etc. then another embodiment for this purpose is illustrated in FIG. 10. There is shown in FIG. 10 a construction similar to that shown in FIG. 8 except that the top plate 22 of FIG. 10 has no "down" holes as does the top plate 22 of FIG. 8 There is shown in FIG. 10, a number of stacked baskets (three are shown, 97, 98 and 99) which divide the top region into compartments 100, 101, and 102.

The construction of each basket in FIG. 10 is shown to better advantage in FIG. 11. Each basket is shown to comprise a supporting cylindrical wall 103 and a coarse double screen bottom, 105, which encloses a filter (the filter 109 is shown secured between screens 105 and 107 in FIG. 10). A section of standpipe 108 is positioned in the center of the basket so that when the basket stack is placed on the top side or on top of the plane defined by the ends of the tubes, the standpipe section supporting the tubes and the standpipe sections in the baskets form one continuous standpipe so that liquid passes up through the tubes and through the bottom of each basket in succession to the top of the standpipe then down through the exit port at the bottom of the standpipe.

One method of operation employing the embodiment shown in FIG. 10 is to place activated carbon 111 in the bottom compartment 102, a strong base resin 113 in the second compartment 101, and a strong acid resin 115 in the third compartment 100 so that particulates, organic contaminants, negative and positive ions are extracted successively from the liquid as the liquid passes through the tubes, the activated carbon and the resins. A major advantage of the construction is that liquid flows upwards in each compartment so that the carbon or resin agents in each compartment do not pack. Packing occurs when the forces of gravity and liquid flowing through a particulate medium both act in the same direction. A second advantage is that each basket can be removed conveniently in order to replace spent carbon or resin.

There are many installations that have settling tanks installed at considerable expense where it is later required to upgrade the settling operation. A typical tank size is 4 feet wide, 8 feet long, 4 feet deep. These tanks typically have a dam (weir) along a top edge over which water is discharged (spilled) after settling has occurred. The tanks are not dimensioned conveniently to install straight inclined tubes as practiced by the prior art since a large fraction of the volume of the tank could not be filled with straight tubes inclined at 51°. One embodiment of this invention illustrated in FIG. 12 resolves this retrofit problem. There are shown the top surfaces of two bundles of helically wound tubes 200 installed in an existing settling tank 201. The outer shape of each helical bundle is approximately a cube as indicated by the fact that the open ends of the tubes are seen over the entire surface of the liquid in the tank, even in the "corners" of the surface. In this construction, the tubes in the corners (region A) are shorter than the tubes whose ends are shown in region B, but are, nevertheless helically shaped and slanted at an angle of 51° to the horizontal. Liquid inlet 203 and sludge outlet 199, are shown.

As another embodiment for solving this retrofit problem, and illustrated in FIG. 13, a rigid foam blanket 204 is positioned over the corner "A" regions of the top surfaces and a cap 202 is positioned over the standpipe in order that all of the liquid escaping through exit opening 207 must first come up through the inclined tubes. The water inlet, 203, is shown.

Figure 15:
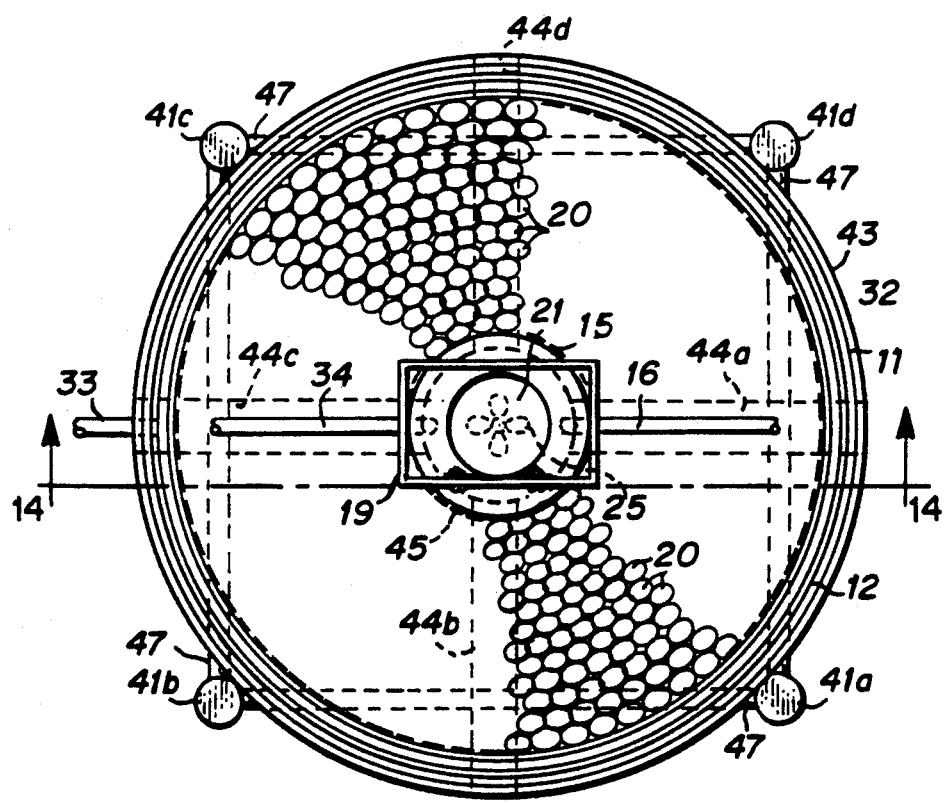
FIG. 15 shows a top plan view of the tank plus tube assembly of FIG. 14.

FIG. 14 and 15 show the preferred, current best mode where a precipitating and/or flocculating agent is added to the liquid to be clarified using the helical tube bundle of this invention. The settling tank assembly 10 of this embodiment comprises an outer shell formed of a cylindrical tube 12 which is attached at its lower end to a conical settling/sludge collection section 27 which terminates at the bottom in an outlet pipe 75 for sludge exit. The helical tube bundle 20 is formed around the vertical central cylindrical standpipe 14, which supports at its top end 15 a motor assembly 17 comprising a box frame 19 and motor 21, from which extends axially downwardly a shaft 23 having one or more sets of propellers 25. As best seen by comparing FIGS. 14 and 15, the motor box frame may be supported by the standpipe by four slots cut upwardly from the bottom of the longitudinal sides of the box. The upper end 15 of the standpipe fits in the slots in the box. The bottom end 18 of the standpipe is open to the settling zone 27. The standpipe thus forms a reaction and degassing zone 29.

The tube bundle 20 is smaller in outside diameter than the I.D. of the tank 12. Adjacent the upper end of the bundle and filling the gap is a J-shaped weir 32, which is appropriately secured in place, and which has a clarified liquid outlet pipe 33. One or more reactant inlet pipes 34 introduce reactant and/or flocculant reagents, such as NaOH into the reaction zone. The polluted liquid is inlet via pipe 16.

It is preferred to foam the tube bundle 20 in place using a curable urethane foam 35 which adheres to both the inner wall of the tank 12 and the tube bundle 20. As shown, once the tube bundle 20 is foamed in place, it supports the standpipe 14 in place. Alternately, a support ring 73, generally C-shaped and shown in phantom at the bottom of the bundle, may be employed to support the bundle/standpipe assembly.

The tank 10 is preferably a rotationally molded plastic tank, but may be fiberglass, wood, metal or the like. The tank is supported on a 4-legged stand assembly 39, comprising a square array of legs 41a, b, c, d, to which is welded at their upper ends a circumferential ring 43 sized so that the tank 12 fits therein. Four inclined straps 44 a-d are welded at their upper ends to the strap 43, and they terminate at a ring 45 at their lower ends. Appropriate reinforcement bars or straps 47, 49, 51 may also be employed.

In operation the polluted liquid (e.g. water) enters via pipe 16, the necessary amount of precipitating reagent (e.g. NaOH, air, ammonia) and/or flocculating agent is added in the reaction and degassing zone 29, the liquid is mixed with propeller 23/25, the bubbles are broken up and rise out the top 15 of the standpipe 14. The liquid flows downwardly into the quiescent settling section 27, thence up the helical tubes (as described above) with sludge coming back out the bottom of the tubes where it is collected in the conical bottom and removed via outlet pipe 75. The clarified liquid flows out of the top of the helical tubes to the circumferential weir 32 and thence out outlet pipe 33.

In addition to mixing the components, the mixing propeller(s) 25 also cause the liquid to circulate in a vorticular stream pattern in the settling region below the tubes. This adds a velocity component that helps the liquid enter the bottom end of the inclined tubes and sludge to exit through the outlet pipe 75. Precipitating agents that may be injected into the standpipe 14 via pipe 34 include a solid, such as lime, a liquid solution such as sodium hydroxide and/or a flocculating agent, or a gas such as ammonia or oxygen. An advantage of the construction shown in FIGS. 14 and 15 is evident When the addition of a precipitating agent is accompanied by the formation of a gas in the liquid in the standpipe. This can occur, for example, when lime is mixed with the polluted liquid in order to raise the pH to precipitate metal ions. The propellers are very effective in breaking up bubbles 62 that form and would otherwise impede the flow of forming precipitate down and out of the bottom of the standpipe 18. Furthermore, the gases generated in the precipitating step are often hazardous (e.g. methane), and it is necessary to collect them. This can be readily accomplished with the construction of FIG. 14 since the gases coming out of the top open end of the standpipe can easily be collected.

Regarding flow of fluid it may be co-rotational or counter-rotational with respect to the "twist" of the tube bundles. That is, by control of the propeller rotation direction, the liquid can have a flow pattern (as seen from the top, FIG. 15) either in the same direction or opposite to the direction of twist of the tubes around the standpipe.

In the foregoing paragraphs, the construction of a settling tank has been described that utilizes inclined tubes shaped like helices which meet the objects of conserving space and providing a uniform flow in all regions of the tank. A practical method to construct the tubes has been presented. The oval-shaped cross section of each tube has been shown to increase settling rate. Means for precipitation, gas release, imparting vortex flow, settling, activated surface absorption, and ion exchange have been disclosed alone or combined in one or more constructions featuring the advantages of upward flow to avoid compaction of treatment media, economy of space and construction and convenience in maintenance and operation.

It should be understood that various modifications within the scope of this invention can be made by one of ordinary skill in the art without departing from the spirit thereof. We therefore wish our invention to be defined by the scope of the appended claims as broadly as the prior art will permit in view of the specification.

We claim:

1. A method for making a bundle of helical tubes from rigid tubing each tube having a common length and cross-sectional dimensions, a common helical axis and each tube having an open top end lying on a common top plane and a common bottom end lying on a common bottom plane, and each helical tube having a common slope B, said method comprising:
   a) forming a mold surface wherein the equation of the surface of the mold is given by a relation between polar coordinates $Z = r\phi(\tan B)$, where r, Z, and $\phi$ are polar coordinates that define the location of a point on the surface, r is the radial coordinate, $\phi$ is the angular coordinate, and z is the coordinate along a direction orthogonal to the r and $\phi$ coordinates, tan B is the slope of the surface in a direction on the surface defined by a constant value of r, said resulting mold surface having helical grooves defined by said constant value of r;
   b) softening each said tube;
   c) laying said softening tube in one of said grooves to conform to a helical shape;
   d) hardening said tubes to retain said helical shape;
   e) arranging said helically shaped tubes to form said bundle; and
   f) securing said tubes together.

2. A method as in claim 1 which includes the added step of:
   a) securing each said tube to at least one of its neighboring tubes.

3. A method for making a bundle of helical tubes from flexible tubing, each tube having a common length and cross sectional dimensions, a common helical axis and each tube having an open top end lying on a top plane and a common bottom end lying on a common bottom plane and each helical tube having a common slope, tan B, said method comprising:
   a) cutting said flexible tubing to provide tubes having said commonly length;
   b) attaching said top end of a first one of said tubes to a standpipe at a first location;
   c) wrapping said first tube around said standpipe to form a first helical tube;
   d) attaching said bottom end of said helical tube to said standpipe at a second location;
   e) using a guide means to adjust the shape of said first helical tube to have said slope along its said entire length; and
   f) laying additional ones of said tubes around said standpipe and securing said tubes in position to form said bundle of tubes, with said top and bottom ends lying in common top and bottom planes respectively.

4. A method as in claim 3 wherein said laying and attaching step further comprises securing said tube to at least one of said previously formed tubes.

5. A method for making a molding surface wherein a location, P, on said surface, having polar coordinates: r, the radial coordinate; $\phi$, the azimuthal coordinate; and z, the rectangular coordinate orthogonal to r and $\phi$; is given by:

$$z = \phi r(\tan B)$$

and wherein tan B is a parameter defining the slope of said molding surface, said method comprising:

a) providing a rectangular sheet having a first and second edge wherein the ratio of the length of said first edge of said sheet divided into the length of said second edge of said sheet is tan B;
b) cutting said sheet along a diagonal to form first and second sheets that are right triangles;
c) bending each said sheet to form a cylinder about an axis, said cylinder having a base which is a circle with a center and whose perimeter is said first edge and having an edge whose slope with respect to said base is tan B;
d) cutting a plurality of strings, each having two ends;
e) attaching one end of each said strings to said center;
f) attaching the other ends to said sloped edge thereby forming a tent of strings wherein each string is tangent to said surface defined by:

$$z = \phi r \tan B;$$

g) forming a sculpture bounded by said base, said bent sheet and said tent of strings to provide a negative surface of said molding surface;
h) placing said second bent sheet onto said first bent sheet with said sloped edges coincident thereby forming a form for casting;
i) casting a permanent molding material against said negative surface and permitting said casting to harden; and
j) removing said sculpture.

6. A method as in claim 5 wherein said casting step comprises casting concrete.

7. A clarifying apparatus for separating impurities from a polluted liquid comprising in operative combination:
   a) a tank having a generally cylindrical upper section for housing a settling tube bundle, and a lower conical section having a sludge outlet port therein;
   b) a settling tube bundle assembly having a central standpipe forming a reaction zone surrounded by a plurality of settling tubes secured thereto;
   c) each of said settling tubes having a common length, a common cross-sectional dimension, a top and a bottom end, and each formed into a continuous helix having a common slope;
   d) said settling tube bundle supporting said standpipe generally axially centrally of said tank in said upper cylindrical section and providing a quiescent settling zone below the bottom end of said tubes;
   e) means for supporting said tank with said standpipe in a generally vertical orientation;
   f) means for introduction of said polluted liquid into the top end of said standpipe into said reaction zone;
   g) a circumferential weir disposed radially outward of said tube bundle and including an outlet therefrom for removal of clarified liquid.

8. A clarifying apparatus as in claim 7 which includes:
   a) means for introduction of a reagent into said reaction zone; and
   b) means for stirring the liquid in said reaction zone and to assist in release of bubbles forming therein.

9. A clarifying apparatus as in claim 7 which includes:
   a) means for stirring liquids in said reaction zone supported on said standpipe.

10. A clarifying apparatus as in claim 8 wherein:
    a) said stirring means is supported on said standpipe.

11. A clarifying apparatus as in claim 10 wherein:

a) said tube bundle is at least in part secured to said tank by rigid foamed-in-place adhesive foam.

12. A clarifying apparatus as in claim 11 wherein:
a) said foam is urethane.

13. A clarifying apparatus as in claim 12 wherein:
a) said tubes are at least in part secured to each other by rigid adhesive.

* * * * *